United States Patent [19]
Klein

[11] 3,733,882
[45] May 22, 1973

[54] BLIND RIVETTING TOOL WITH AUTOMATIC LOADING MEANS

[75] Inventor: Jean-Pierre Klein, Haut-Rhin, France

[73] Assignee: Rivtac Blindnieten, A.G., Bale, Switzerland

[22] Filed: Feb. 9, 1971

[21] Appl. No.: 113,911

[52] U.S. Cl. .................................................72/391
[51] Int. Cl. .............................................B21j 15/20
[58] Field of Search.....................72/391, 453, 424; 227/10, 135, 136, 138

[56] References Cited

UNITED STATES PATENTS

| | | |
|---|---|---|
| 3,281,046 | 10/1966 | Boulay ...........................227/136 |
| 3,363,817 | 1/1968 | Brack.................................227/9 |
| 3,367,166 | 2/1968 | Newton............................72/391 |
| 3,554,425 | 1/1971 | Oesterle...........................227/10 |
| 3,580,457 | 5/1971 | Henshaw..........................72/391 |

FOREIGN PATENTS OR APPLICATIONS

| | | |
|---|---|---|
| 371,817 | 6/1939 | Italy...................................72/391 |

Primary Examiner—Charles W. Lanham
Assistant Examiner—Gene P. Crosby
Attorney—Chittick, Pfund, Birch, Samuels & Gauthier

[57] ABSTRACT

A blind rivetting tool having an automatic loading means. The said means includes a feed belt which carries rivets into the gun, and also carries the sheared mandrels out of the gun. The invention further includes a novel mechanism for intermittently advancing the belt through the rivetting tool.

16 Claims, 11 Drawing Figures

PATENTED MAY 22 1973
3,733,882
SHEET 1 OF 4
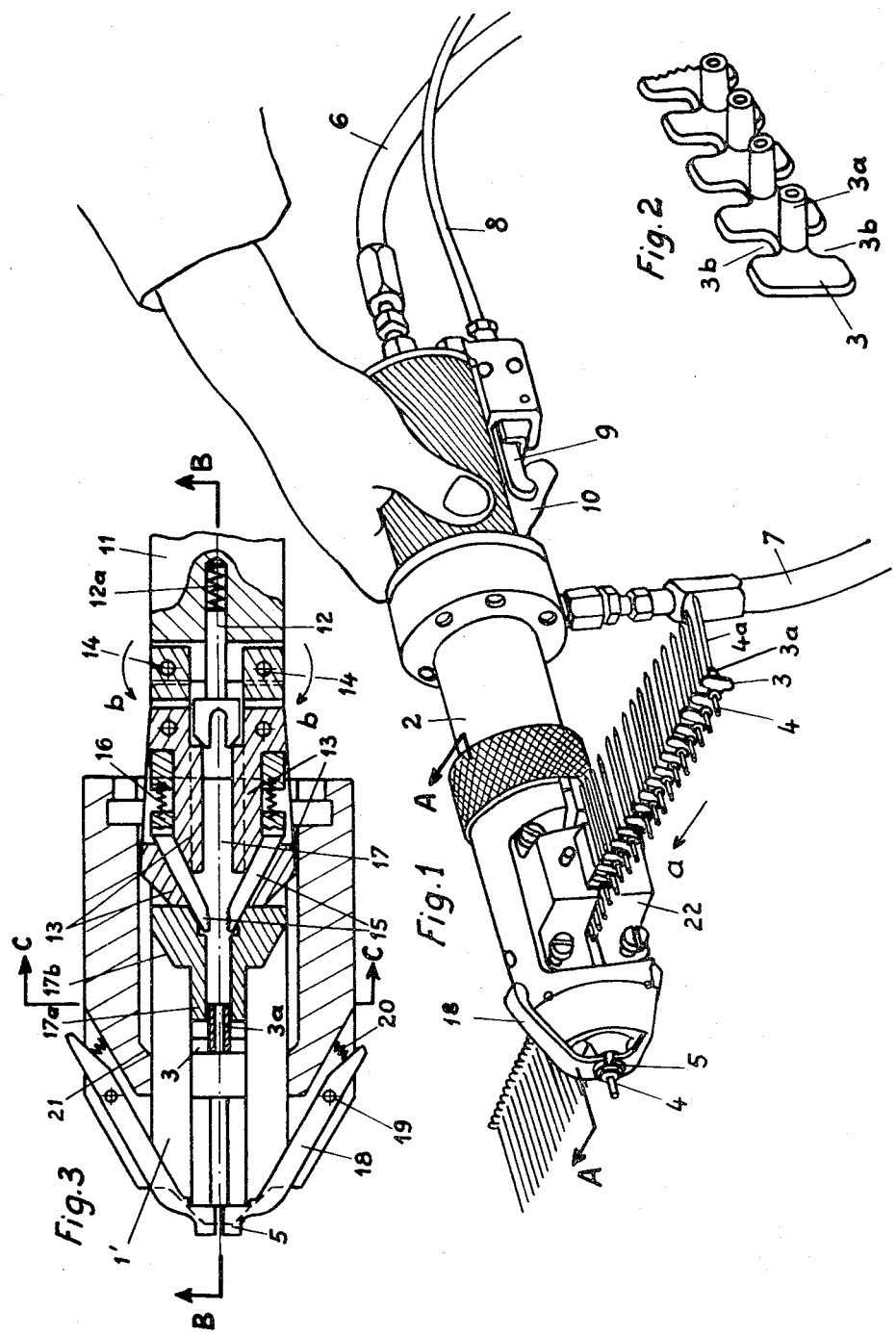

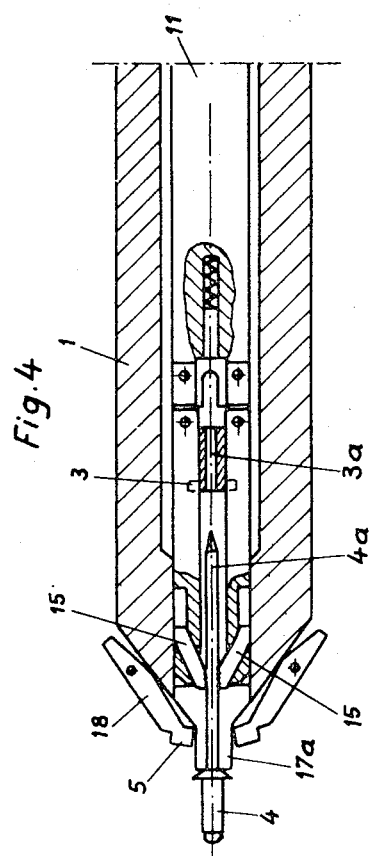
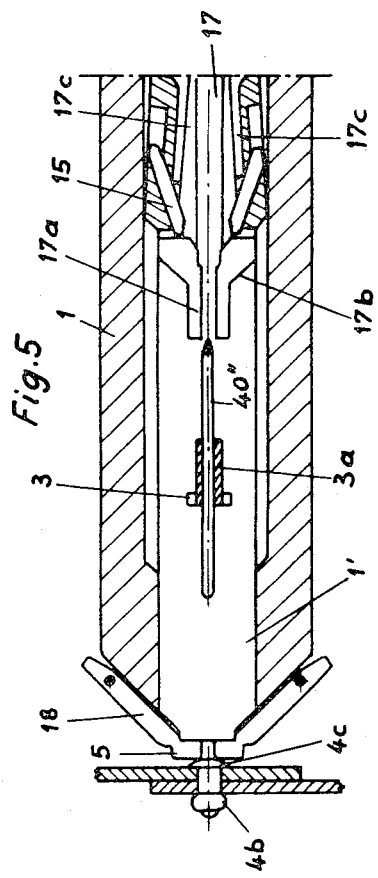

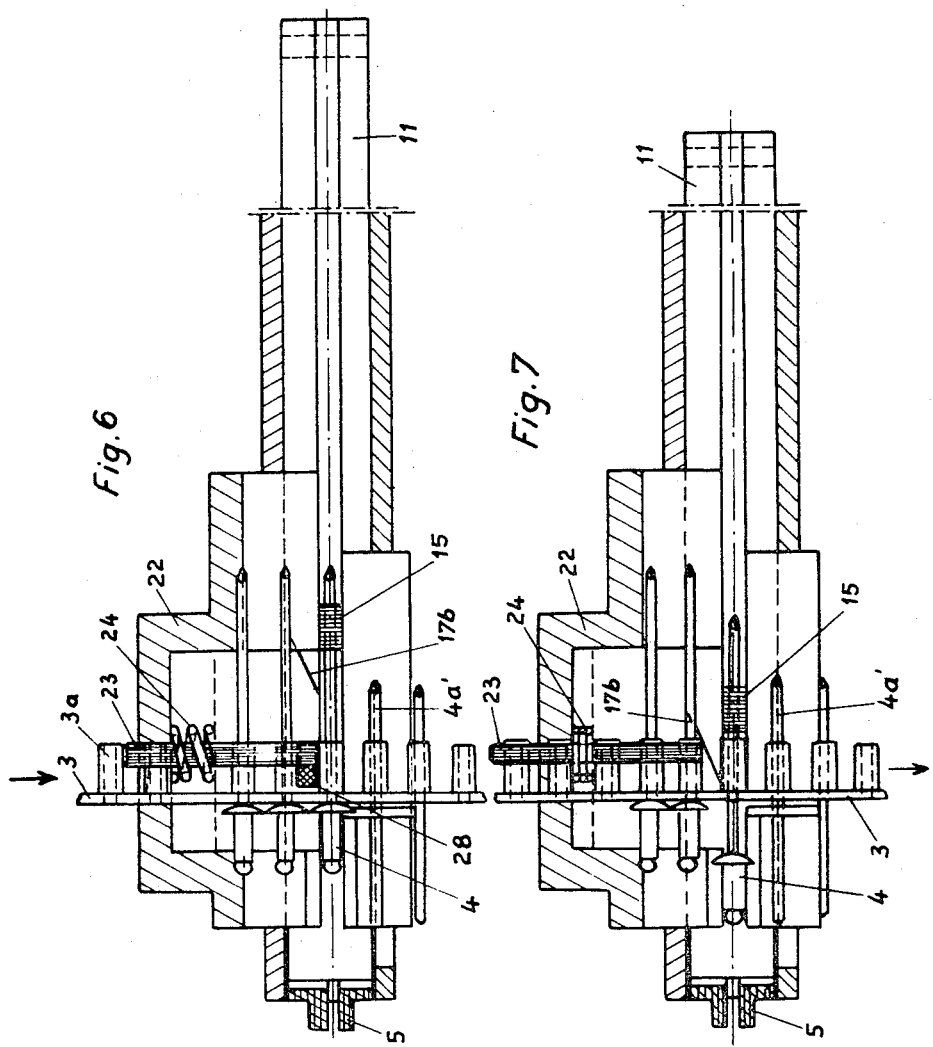

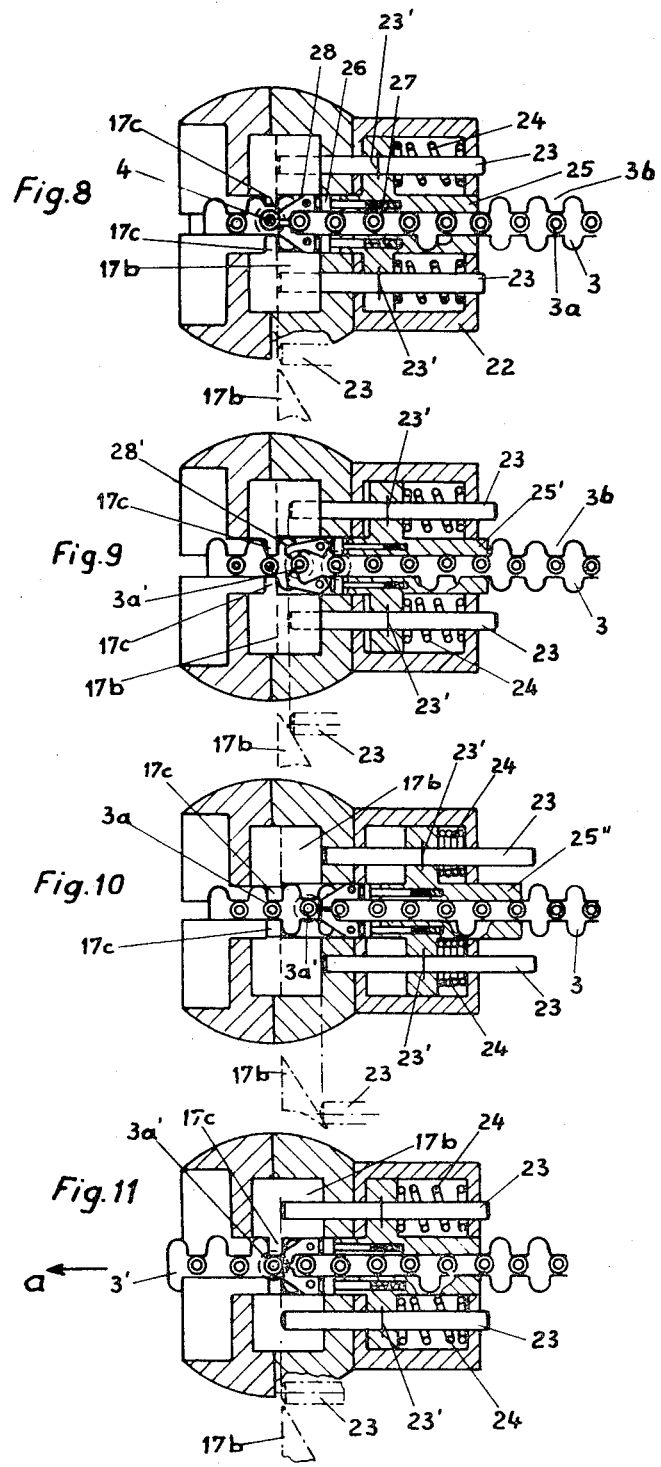

BLIND RIVETTING TOOL WITH AUTOMATIC LOADING MEANS

DESCRIPTION OF THE INVENTION

This invention relates generally to blind rivet guns and more particularly to a novel and inventive method of automatically loading the same.

It will be understood that the term "blind rivet" refers to those rivets which are accessible from only one side during the rivetting operation. Such rivets are usually comprised of a tubular sleeve having a generally annular pre-formed manufactured head at one end thereof. The sleeve has a mandrel extending axially therethrough, and the mandrel has an enlarged head located adjacent to the other opposite end of the sleeve. During a rivetting operation, the rivet is axially inserted through aligned holes in the pieces to be secured together and the manufactured head is held while exerting an axial force on the mandrel to pull the enlarged mandrel head towards the front rivet head. This "sets" the rivet by deforming the tubular sleeve to produce a back rivet head or "point" prior to the mandrel being sheared.

Conventional blind rivetting tools usually consist of a hand-held gun-type assembly having components suitably designed to carry out the foregoing operation. Up to the present time, such tools have been manually loaded, with rivets being introduced into the tool singly for each rivetting operation.

The present invention has for its principal object the provision of means for automatically loading blind rivets into a rivetting tool. Another object of the present invention is to employ a pre-loaded belt-type magazine for carrying the rivets into the rivetting tool. A further object of the present invention is to employ a belt-type magazine as a means for carrying sheared mandrels out of the rivetting tool. Still another object of the present invention is to provide a novel and improved mechanism for intermittently advancing the aforesaid belt through the rivetting tool in timed sequence with the rivetting operation.

The invention is further described with reference to the accompanying drawings, wherein:

FIG. 1 is a perspective view of a rivetting tool embodying the concepts of the present invention;

FIG. 2 is a perspective view of a section of an unloaded feed belt which may be employed with the tool shown in FIG. 1;

FIG. 3 is a vertical sectional view taken along line A—A of FIG. 1;

FIGS. 4 and 5 are schematic sectional views again taken along line A—A of FIG. 1 showing the relationship of various tool components during the rivetting operation;

FIGS. 6 and 7 are schematic sectional views taken along line B—B of FIG. 3 showing the relationship of various components included in the mechanism for advancing the feed belt during different stages of the rivetting operation; and FIGS. 8-11 are again somewhat schematic sectional views taken along line C—C of FIG. 3 illustrating the operation of the belt advancing mechanism.

Referring initially to FIGS. 1-5, there is shown a rivetting tool having a head section 2 which embodies the mechanism comprising the present invention. The head section 2 includes an elongated housing 1 defining an interior elongated chamber 1' which is traversed laterally by a belt 3 loaded with a plurality of blind rivets 4 in spaced hollow studs or cylindrical extentions 3a. The belt moves through the tool in a direction indicated schematically in FIG. 1 by the arrow "a". The rivets are presented, one at a time, to a setting punch 5 by means of a slide assembly 11 which operates reciprocally within the housing 1. The slide 11 may be operated hydraulically in any known manner by fluid carried through flexible lines 6 and 7. The flow of hydraulic fluid may be pneumatically controlled by compressed air from line 8 and a valve which has a trigger 9 positioned to be manipulated by the finger 10 of an operator.

As is best shown in FIG. 2, the belt 3 includes rearwardly protruding cylindrical extensions 3a which as can be seen in FIGS. 6 and 7 are designed to axially accept the elongated mandrels 4a of the blind rivets 4.

The reciprocally operating slide 11 includes a pusher 12 which is spring-loaded by means of a spring 12a. The pusher 12 serves as a means of spreading a pair of clamps 13 which are pivotally mounted on the slide 11 as at 14. The clamps 13 in turn support a pair of jaws 15 which are spring-loaded by springs 16. The end of slide 11 is shaped to form a driver 17 having a nose 17a. During a rivetting operation, the following takes place: trigger 9 is manipulated to drive slide 11 forward (from right to left as viewed in FIGS. 3-5). When this occurs, the nose 17a of the slide picks up a rivet 4 and carries it towards the setting punch 5. The gripping surfaces of jaws 15 are suitable spaced, due to the spreading action being exerted by pusher 12 on clamps 13, so that the jaws clear the belt 3 by passing through the notches 3b (See FIG. 2). Thereafter the clamps 13 contact shoulders 21 on housing 1, and this in turn forces the clamps inwardly with the result that the jaws 15 come into gripping engagement with the rivet mandrel 4a, as shown in FIG. 4. At the end of the slide's advance stroke (again as shown in FIG. 4), the rivet 4 is located at the nose of the tool, and the two levers 18 making up the setting punch 5 are spread apart by the nose 17a of the driver 17. The levers 18 are each mounted for pivotal movement at 19 and are spring-loaded as at 20 for return to the closed position shown in FIG. 3 when the driver is retracted.

At this stage, the rivet 4 is ready for insertion into aligned holes in the two pieces to be joined, as shown in FIG. 5. Trigger 9 is then manipulated to retract slide 11. When this occurs, the levers drop in behind the rivet's manufactured head 4C and due to the gripping action of jaws 15 on mandrel 4a, the rivet is deformed to produce a point 4b. At some point during the continued retraction of slide 11, the rivet mandrel 4a is sheared and the sheared piece 40'' is re-inserted in the cylindrical extension 3a of belt 3, all as shown in FIG. 5.

The mechanism for intermittently advancing the belt 3 in timed sequence with the above-mentioned rivetting operation will now be described with further reference to FIGS. 6-11. This mechanism is enclosed within a housing section 22 and includes a pair of shafts 23 which are pinned as at 23' to gate members 25, the latter being urged to the left as viewed in FIGS. 8-11 by means of springs 24 surrounding the shafts 23. Each gate 25 supports a pusher element 26 which is spring loaded by a small coiled spring 27. The pusher elements 26 in turn act on small claws 28 which are pivotally mounted on the gates 25.

It will be understood from a reference to FIGS. 5–7 and the schematic representations in FIGS. 8–11 that the driver 17 further includes inclined surfaces 17b which act to push shafts 23 to the right (as seen in FIGS. 8–11) when the slide 11 is advanced. This results in the small claws 28 being spread apart as at 28' in FIG. 9 to clear the cylindrical extension 3a of belt 3 as the gates move to a location shown at 25'. Once past the cylindrical extension 30, the claws 28 again close (see FIG. 10) under the influence of the spring-loaded pusher elements 26.

The driver 17 further includes elongated shoulders 17c which extend into the notches 3b in the belt 3 and thus hold the belt 3 against movement in direction "a" until the sheared mandrel section 40'' is re-inserted in the belt. As the slide 11 continues its rearward movement, the shoulders 17o eventually clear the notches 3b, and when this occurs, the belt 3 is driven forward in the direction "a" under the influence of springs 24, to the position shown at 3'' in FIG. 11, thus aligning a fresh rivet along the central axis of the tool in preparation for the next rivetting operation.

I claim:

1. A rivetting tool comprising in combination: a housing defining an elongated chamber; magazine means for laterally feeding rivets into said chamber; reciprocal slide means movable along the axis of said chamber for advancing rivets from said magazine means to the nose of said tool at the point at which the rivetting operation is to be performed; means carried by said slide means cooperating with punch means on the nose of said tool for deforming a rivet as the slide means is retracted; and means responsive to the movement of said slide means for intermittently advancing said magazine means after each rivetting operation has been completed.

2. A rivetting tool as recited in claim 1 for setting rivets having a sleeve with a manufactured head at one end and a mandrel extending through the sleeve with an enlarged head adjacent to the other end of the sleeve, said tool being further characterized by deforming means for clamping a portion of said mandrel extending from said first end of the sleeve of said rivet to pull said mandrel as said slide means is retracted so that the enlarged head of said mandrel deforms said other end of said sleeve.

3. The riveting tool as recited in claim 2 wherein said clamping means comprises a pair of opposing jaws located within said elongated chamber and pivoted from said slide means; and wherein said tool further includes: pusher means movable with said slide means and adapted to spread said jaws as said slide means moves to advance a rivet so that said magazine means passes between said jaws as said deforming means is carried with said slide means.

4. The riveting tool as recited in claim 3 wherein said tool further includes shoulders on the inside of said elongated chamber adapted to contact said jaws to close them as they are carried through said chamber when said slide means advances a rivet; said shoulders being so located that said jaws close about the mandrel of said rivet when it is at the nose of said tool, said other end of said sleeve being deformed as said mandrel is pulled by said jaws when said deforming means is retracted with said slide means.

5. The riveting tool as recited in claim 4 wherein said magazine means comprises spaced hollow studs adapted to contain the mandrels of respective rivets; wherein said slide means advances a rivet from said magazine means by forcing it from its respective stud; and, wherein said jaws when retracted with said slide means break off a piece of said mandrel and reinsert said piece into its respective hollow stud.

6. The riveting tool as recited in claim 4 wherein said magazine means comprises spaced hollow studs adapted to contain the mandrels of respective rivets; wherein said slide means advances a rivet from said magazine means by forcing it from its respective stud; and wherein portions of said magazine means adjacent said studs are notched to accommodate said jaws as said magazine means passes between said jaws advancing with said slide means.

7. The riveting tool as recited in claim 1 wherein said means for intermittently advancing said magazine means comprises:
   means biasing said magazine means in its feed direction;
   means for clamping said magazine means stationary;
   means for disabling said clamping when said slide means has advanced to locate a rivet at the nose of said tool; and
   means connected to said slide means for holding said magazine means stationary when a rivet is located at the nose of said tool, said holding means being disabled as said slide means is retracted, said clamping means being operative as said slide means is retracted for a period longer than said holding means is operative such that said biasing means advances said magazine means an increment after said magazine means is clamped by said clamping means.

8. The riveting tool as recited in claim 7 wherein said disabling means comprises inclined surfaces operable to cause releasing by said clamping means as said slide means advances.

9. The riveting tool as recited in claim 7 wherein said magazine means contains spaced notches, and said holding means comprises shoulders adapted to engage at least one notch as said slide means advances to locate a rivet at the nose of said tool.

10. The riveting tool as recited in claim 7 wherein said magazine means comprises spaced hollow studs adapted to contain said rivets and said clamping means comprises opposing claws spring-loaded to a closed position and adapted to successively hold said studs.

11. The riveting tool as recited in claim 1 wherein said magazine means comprises spaced hollow studs adapted to contain the mandrels of respective rivets, and wherein said slide means advances a rivet from said magazine means by forcing it from its respective stud.

12. A method of setting blind rivets of the type having a sleeve with a manufactured head at one end and a mandrel extending through said sleeve and having an enlarged head adjacent the other end of said sleeve, said method comprising:
   holding said rivets at spaced openings in a magazine;
   placing said magazine within a riveting tool;
   forcing a rivet within said tool from said magazine to advance said rivet to the nose of said tool at a point where said rivet is to be set;
   pulling the mandrel of said rivet to deform the other end of said rivet's sleeve with said mandrel's enlarged head;

breaking a piece of the mandrel from the set portion of said rivet;

reinserting the broken-off piece of each mandrel into its respective opening in said magazine;

advancing said magazine through said tool to locate another rivet within said tool; and repeating the steps of forcing, pulling, breaking, reinserting and advancing.

13. A tool for setting blind rivets of the type having a sleeve with a manufactured head at a first end and a mandrel extending through said sleeve and having an enlarged head adjacent the other end of said sleeve, said tool comprising: a housing defining an elongated chamber; magazine means for laterally feeding rivets into said chamber; reciprocal slide means movable along the axis of said chamber for advancing rivets from said magazine means to the nose of said tool at the point at which the riveting operation is to be performed; means carried by said slide means cooperating with punch means on the nose of said tool for deforming said other end of the sleeve of a rivet by clamping and pulling a portion of the mandrel of said rivet as the slide means is retracted, said deforming means breaking off a piece of said mandrel when being retracted with said slide means and reinserting said piece into its respective location in said magazine means; and means for intermittently advancing said magazine means after each riveting operation has been completed.

14. The tool as recited in claim 13 wherein said magazine means comprises spaced hollow studs adapted to contain the mandrels of respective rivets.

15. For use in setting blind rivets of the type having a tubular sleeve with an annular manufactured head at one end and a mandrel extending through said sleeve and said annular head, and having an enlarged head at the opposite end of said sleeve, an apparatus comprising in combination: a housing terminating in a nose at which the riveting operation is to be performed, said nose having an opening therethrough communicating with an interior chamber in said housing; magazine means removably supported by said housing and movable laterally through said chamber, said magazine means being adapted to retain a plurality of laterally spaced rivets; slide means carried by said housing and reciprocally movable through said chamber in opposite directions transverse to the direction of movement of said magazine means through said chamber; punch means at the nose of said housing; means carried by said slide means and operative upon advancement of said slide means towards said nose to remove a rivet from said magazine means and to carry said rivet through said opening to the nose of said housing, said means being further operative upon retraction of said slide means to cooperate with said punch means in setting said rivet by deforming said sleeve while separating a portion of said mandrel from the set rivet and reinserting the separated mandrel portion in said magazine means; and means responsive to the movement of said slide means for intermittently advancing said magazine means after each riveting operation has been completed.

16. A method of setting blind rivets of the type having a tubular sleeve with an annular manufactured head at one end and a mandrel extending through said sleeve with an enlarged head adjacent to the other end of said sleeve, said method comprising: supporting a plurality of said rivets in laterally spaced alignment along an elongated magazine member, removing individual rivets from said magazine member and advancing said rivets along an axis to the location at which the riveting operation is to be performed, setting each rivet at said location by deforming said sleeve with an accompanying separation of a portion of the mandrel from the set rivet, returning said separated portion along said axis from said location and reinserting said separated portion in said magazine member, and intermittently advancing said magazine member across said axis in sequence with each riveting operation.

* * * * *